Aug. 2, 1932.  J. E. LE FEVER  1,869,901

ANIMAL FEEDING DEVICE

Filed June 7, 1930

INVENTOR.
John E. LeFever

BY *Lancaster, Allwine and Rommel*
ATTORNEYS.

Patented Aug. 2, 1932

1,869,901

UNITED STATES PATENT OFFICE

JOHN ELMER LE FEVER, OF TIONAGA, ONTARIO, CANADA

ANIMAL FEEDING DEVICE

Application filed June 7, 1930. Serial No. 459,697.

The present invention relates to animal feeding and watering devices and the primary object of the invention is to provide a feeder primarily intended for use in ranch raising of fur bearing animals such as fox, marten, fisher, etc.

A further object of the invention is to provide a feeder adapted to be mounted upon a wire netting or fencing of an enclosure for animals to permit feeding of the animals without entering the pen.

A further object of the invention is to provide a feeder of this character having a removable feed pan capable of being readily removed when in a position outside of the enclosure and held against removal when inside of the enclosure, thus preventing the animals from removing the feed pan and resulting in considerable loss of time in collecting the feed pans since some animals will bury the pans in the earth or snow.

A further and important object of the invention is to provide an improved animal feeder which thru use will prevent spreading of disease and parasite infection by preventing the animals from placing their feet in the feed pan.

A further object of the invention is to provide a device of this character which may be very economically constructed from sheet metal stampings of novel formation and which may be readily operated without allowing escape of the animals within the enclosure.

Other objects and advantages of the invention will be apparent during the course of the following detailed description, taken in connection with the accompanying drawing forming a part of this specification and in which drawing.

Figure 1:
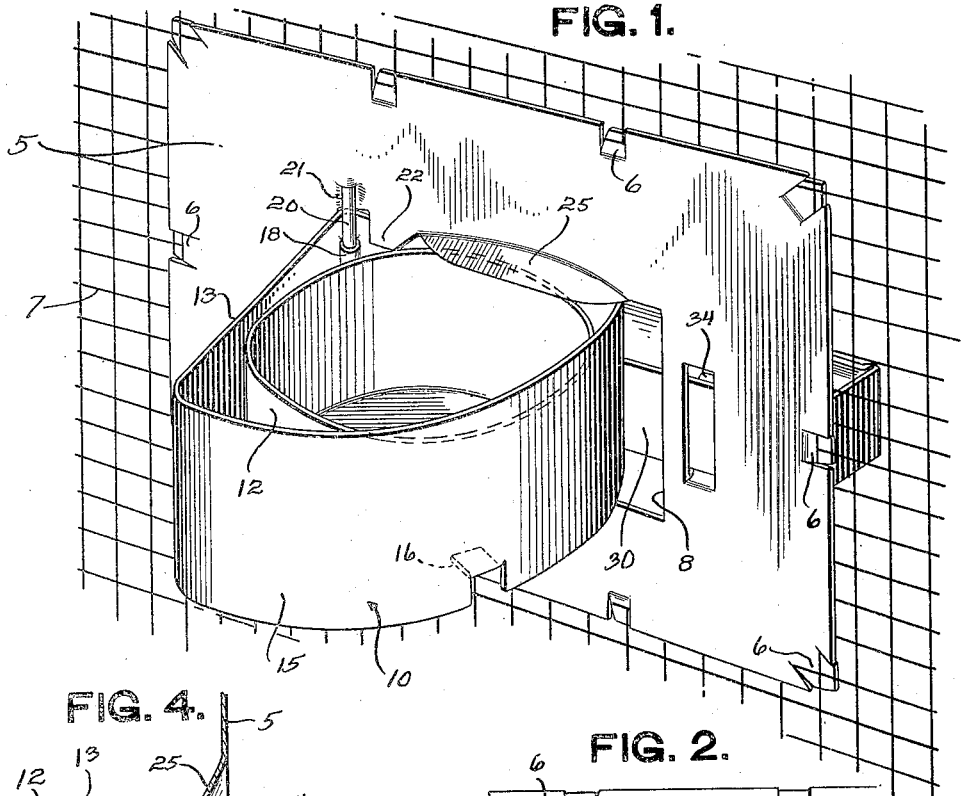
Figure 1 is a perspective view of the improved feeder shown in the feeding position.

In the drawing, and wherein similar reference characters designate corresponding parts thruout the several views, the improved feeder comprises a flat, rectangular shaped mounting plate 5 which may be formed from a suitable gauge sheet metal. Struck from each marginal edge of the mounting plate 5 are cleats 6 adapted to be bent over the wire netting or fencing 7 forming an enclosure for the animals. Formed thru the central portion of the mounting plate 5 is a rectangular shaped opening 8 thru which is movable a substantially quadrant shaped carrier or holder 10 removably supporting a feed pan 12.

The carrier or holder 10 is formed from a flat strip of metal forming the straight side walls 13 and 14 and the arcuate wall 15. The straight side walls 13 and 14 are arranged at an angle of nearly 90° apart and the ends of the metal strip are preferably overlapped along the wall 14 and secured as by welding, riveting or any other suitable means. The holder 10 is open at its top and bottom and is of a height substantially equal to the height of the rectangular-shaped opening 8. Struck inwardly from the lower edge of each holder wall 13, 14 and 15, and at points midway the ends of each wall is a lug 16. These lugs 16 are bent inwardly at a right angle to the holder walls and form supports for the preferably cylindrical feed pan 12. The feed pan has a free but snug sliding fit into the holder 10 and when resting upon the lugs 16 preferably has its upper edge spaced slightly below the top edge of the holder.

The holder or carrier 10 is mounted for horizontally swinging thru the opening in the mounting plate to positions whereby the straight side walls 13 and 14 substantially align with the plane of the mounting plate. The angular corner portion of the holder formed at the meeting ends of the side walls 13 and 14 is struck inwardly at spaced points to provide hinge pin barrels 18 which co-act with the intact corner portions 19 to receive a hinge pin 20.

Pressed outwardly from the plate 5 adjacent one end of the opening 8 are vertically aligning loops forming hinge pin eyes 21 adapted to receive the ends of a hinge pin 20. Thus it will be seen that the hinge pin 20 mounts the holder for horizontal swinging movement thru substantially 90° thru the opening 8.

Provided at the upper and lower edges of the opening 8 adjacent the hinge eyes 21 are stop projections or lugs 22 formed as an integral part of the plate 5. These stop lugs 22 extend into the open holder between the straight side walls 13 and 14 and are engaged by the side wall 13 when the holder is swung outwardly and serve as stops for limiting outward swinging of the holder beyond a point whereby the wall 13 serves to close the opening 8. The arcuate end wall 15 during swinging movement of the holder has movement close to one end of the opening 8.

Figure 4:
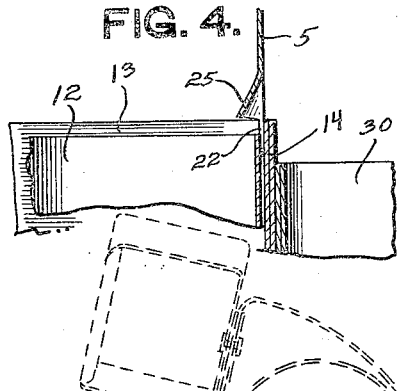
Figure 4 is a fragmentary sectional view showing the arrangement whereby the feed pan is held against removal when in a position at the inside of the feeder.
Figure 2:
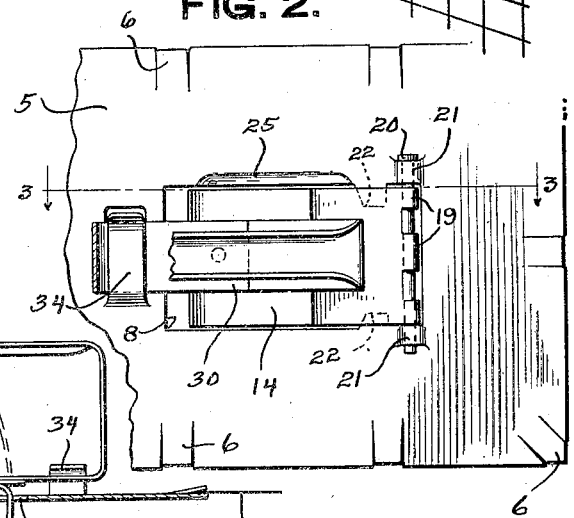
Figure 2 is a plan view of the outside of the feeder showing a fragmentary portion of the handle broken away.
Figure 3:
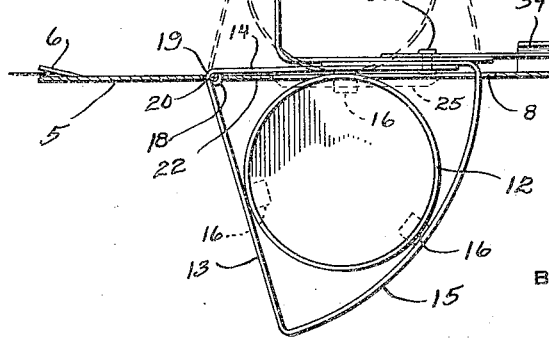
Figure 3 is a horizontal section on the line 3—3 of Figure 2.

Struck inwardly along the top edge of the opening 8 is a retaining lip or flange 25 for preventing removal of the feed pan 12 when the holder is in a feeding position at the inside of the mounting plate 5. As will be observed in Figure 4, this lip or flange 25 extends over a portion of the pan 12 and prevents the animal from removing the feed pan from the holder. When the holder is swung outwardly thru the mounting plate, the inwardly struck flange 25 facilitates removal of the fed pan.

Pivotally carried by the straight side wall 14 is an operating handle 30 which in the present instance is of open rectangular shape and pivotally connected along one side as by the pivot pin 32 to the straight side wall 14 adjacent its juncture with one end of the arcuate end wall 15. The handle 30 is of a length considerably greater than the height of the opening 8 and of such length that when extended parallel with the wall 14 will have one end project beyond the end of the opening 8 for engagement with a keeper 34 pressed from the plate 5. When the handle is engaged in the keeper 34 the swinging holder is prevented from swinging outwardly and the feed pan is held in a position whereby the animal may obtain the food from the pan without swinging the holder outwardly thru the opening 8. The handle 30 is made relatively large to allow the use of gloves or mitts in cold weather and permits unlocking and swinging of the holder with one hand while the operator uses the other hand for placing or removal of the feed pan. By having the operating handle or lever of greater length than the height of the opening permits inward swinging of the holder until the handle strikes the mounting plate and prevents further inward swinging of the holder while the handle is rotated to a locking position behind the keeper 34. When the holder is in a closed position as shown in Figure 1 the side wall 14 closes the opening 8 to prevent escape of small animals.

The feeder will of course be made of different sizes for different animals and may readily be mounted in any form of enclosure. The open holder will prevent collection of foreign matter and food stuffs within the holder and also prevent the holder from becoming filled with snow or ice such as would prevent ready placing of a feed pan in the holder. The feed pans can easily and quickly be removed from the holder for thoroughly sterilizing the pans and thus preventing spreading of disease among the animals.

From the foregoing description it will be apparent that a novel and efficient feeder for caged animals has been disclosed embodying features whereby the animals are prevented from removing the feed pan and requiring the attendant to enter the cage or pen for collecting the empty pans. It will also be apparent that a device of this character has been disclosed embodying novel features of construction permitting economical manufacture. It will also be apparent that the improved feeding device will overcome many obstacles in the feeding of fur bearing animals thru preventing spread of disease among the animals in that the animals cannot remove the feed pan from the holder and contaminate the food by dragging it about the pen.

Changes in the size, shape and arrangement of parts may be made to the form of invention herein shown and described, without departing from the spirit of the invention or the scope of the following claims.

I claim:

1. A feeder of the class described comprising a mounting plate provided with an opening, a holder hingedly supported by the plate for horizontal swinging movement thru the opening, means for limiting swinging movement of the holder into either a loading or a feeding position, a feed pan supported in the holder and removable therefrom when the holder is in a loading position, and means for preventing removal of the pan when the holder is in a feeding position.

2. A feeder of the class described comprising a mounting plate provided with an opening, a holder hingedly mounted upon the plate at one end of the opening for horizontal swinging movement thru the opening, means for limiting swinging movement of the holder into either a loading or a feeding position, an operating handle for the holder, a feed pan removably insertable into the holder, and a retaining flange bent inwardly at the upper edge of said opening to extend over the feed pan and prevent withdrawal thereof when the holder is in a feeding position.

3. A feeder of the class described comprising a mounting plate having an opening therethru, an open holder hingedly mounted for horizontal swinging movement thru the opening, an operating handle for the holder, stop lugs formed on the mounting plate and extending into the open holder for limiting swinging movement thereof into either a loading or a feeding position, a feed pan supported in the holder, and a retaining flange bent inwardly along the upper side of said opening to extend over the feed pan when the holder is in a feeding position to prevent removal of the feed pan.

4. A feeder of the class described comprising a mounting plate having an opening, a quadrant shaped holder including straight side walls, means hingedly supporting the holder at the juncture of the straight side walls for horizontal swinging movement thru the opening, one of said walls closing the opening when the holder is in a loading position outwardly of the mounting plate and the other side wall closing the opening when the holder is in a position inwardly of the mounting plate, means for limiting swinging movement of the holder, an operating handle carried by the holder at the outer side of the mounting plate, a circular feed pan removably insertable into the holder when in a loading position, and a stop flange extended inwardly along the upper edge of said opening for preventing withdrawal of the feed pan when the holder is in a feeding position.

5. A feeder of the class described comprising a mounting plate having an opening therethru, a quadrant shaped holder hingedly supported upon the plate for horizontal swinging movement thru the opening, means limiting outward swinging movement of the holder to a loading position, a handle pivotally carried by the holder at the outer side of the mounting plate and being of greater length than the height of said opening, a keeper formed in the mounting plate at one end of the opening and engageable by the handle for locking the holder inwardly of the mounting plate in a feeding position, a feed pan insertable into the holder when in a loading position, and means preventing withdrawal of the feed pan when the holder is in a feeding position.

6. A feeder of the class described comprising a mounting plate having an opening, a quadrant shaped holder including straight side walls and an arcuate end wall, hingedly supported at the meeting ends of the straight side walls for horizontal swinging movement thru the opening, supporting lugs bent inwardly from the lower edge of each holder wall, a feed pan supported upon the lugs, an operating handle connected with one of the straight side walls for imparting swinging movement to the holder, latch means engageable by the handle for retaining the holder in a feeding position, and means preventing withdrawal of the feed pan when the holder is in a feeding position.

7. A feeder of the class described comprising a flat mounting plate having an opening therethru, a quadrant shaped holder including straight side walls and an arcuate wall and being open at its upper and lower ends, means hingedly supporting the holder for horizontal swinging movement thru the opening, lugs bent inwardly from the bottom edge of each holder wall, a feed pan supported upon the lugs and removable from the holder when swung outwardly thru the mounting plate, means preventing withdrawal of the pan when the holder is swung inwardly thru the plate, and an operating handle for the holder.

8. A feeder of the class described comprising a sheet metal mounting plate having an opening therethru, loops pressed outwardly in the plate at one end of the opening providing vertically aligning hinge eyes, a sheet metal holder having hinge barrels struck from one corner portion thereof, a hinge pin extended thru the hinge eyes and hinge barrels for hingedly supporting the holder for horizontal swinging movement thru said opening, an operating handle for the holder, a keeper struck from the mounting plate and engageable by the handle for retaining the holder in a position at the inner side of the mounting plate, means for limiting outward swinging movement of the holder, and a feed pan removably supported in the holder and held against withdrawal when the holder is in a position at the inner side of the mounting plate.

9. A feeder of the class described comprising a sheet metal mounting plate having an opening formed therethru, mounting cleats struck from the edge portions of the plate, hinge eyes struck from the plate above and below the opening at one end thereof, a quadrant shaped sheet metal holder including straight side walls and an arcuate end wall, hinge barrels struck from the holder at the juncture of the straight side walls, a hinge pin extended thru the hinge eyes and hinge barrels and mounting the holder for horizontal swinging movement thru the opening, stop lugs projecting from the upper and lower edges of said opening and engageable by said straight side walls for limiting swinging movement of the holder, a keeper struck from the mounting plate, a handle pivotally carried by one straight side wall of the holder and engageable with the keeper for locking the holder in a feeding position, a feed pan removably fitting in the holder, and a retaining flange bent inwardly along the top edge of said opening to extend over a part of the feed pan when the holder is in a feeding position.

JOHN ELMER LE FEVER.